US011412893B2

United States Patent
Paskert et al.

(10) Patent No.: US 11,412,893 B2
(45) Date of Patent: Aug. 16, 2022

(54) BLENDING VOLUME REDUCING DEVICE

(71) Applicant: VITA-MIX MANAGEMENT CORPORATION, Olmsted Township, OH (US)

(72) Inventors: Brad Paskert, Olmsted Township, OH (US); David Kolar, Stow, OH (US); Casey Zale, Olmsted Township, OH (US); Rebecca Hammond, Olmsted Township, OH (US)

(73) Assignee: VITA-MIX MANAGEMENT CORPORATION, Olmsted Township, OH (US)

( * ) Notice: Subject to any disclaimer, the term of this patent is extended or adjusted under 35 U.S.C. 154(b) by 661 days.

(21) Appl. No.: 16/343,430

(22) PCT Filed: Nov. 1, 2017

(86) PCT No.: PCT/US2017/059497
§ 371 (c)(1),
(2) Date: Apr. 19, 2019

(87) PCT Pub. No.: WO2018/085369
PCT Pub. Date: May 11, 2018

(65) Prior Publication Data
US 2019/0313854 A1   Oct. 17, 2019

Related U.S. Application Data

(60) Provisional application No. 62/514,330, filed on Jun. 2, 2017, provisional application No. 62/415,535, filed on Nov. 1, 2016.

(51) Int. Cl.
A47J 43/07   (2006.01)

(52) U.S. Cl.
CPC ........ *A47J 43/0716* (2013.01); *A47J 2203/00* (2013.01)

(58) Field of Classification Search
CPC .......................... A47J 43/0716; A47J 2203/00
See application file for complete search history.

(56) References Cited

U.S. PATENT DOCUMENTS 2,664,002 A   12/1953   Anderson
2,744,203 A   5/1956   Collura
(Continued)

FOREIGN PATENT DOCUMENTS

CN   1853547   11/2006
CN   101194807   6/2008
(Continued)

OTHER PUBLICATIONS

Extended European Search Report Communication pursuant to Rule 70 in connection with Patent Application No. 17867385.1 dated Jul. 24, 2020.
(Continued)

*Primary Examiner* — Omar Flores Sanchez
(74) *Attorney, Agent, or Firm* — McDonald Hopkins LLC

(57) ABSTRACT

A blending system is disclosed herein. The blending system may comprise a blender base, a container and a blending volume reducing device. The blending volume reducing device may be removably inserted into the container of the blender system at various positions. The positions may alter the working volume of the container when the blending volume reducing device is inserted in the container.

17 Claims, 11 Drawing Sheets

(56) References Cited

U.S. PATENT DOCUMENTS

| | | |
|---|---|---|
| 2,778,958 A | 1/1957 | Hamm et al. |
| 2,822,123 A | 2/1958 | Cole |
| RE24,607 E | 2/1959 | Seyfried |
| 2,955,186 A | 10/1960 | Ritter |
| 3,064,949 A | 11/1962 | Dewenter |
| D198,070 S | 4/1964 | Musichuk |
| 3,137,327 A | 6/1964 | Muench |
| 3,172,441 A | 3/1965 | Hartwig et al. |
| 3,220,450 A | 11/1965 | Aronson, II et al. |
| D204,117 S | 3/1966 | Di Sesa |
| D204,224 S | 3/1966 | Gantz |
| 3,299,226 A | 1/1967 | Edwards |
| D207,692 S | 5/1967 | Dykes |
| D217,522 S | 5/1970 | Madl |
| 3,548,280 A | 12/1970 | Cockroft |
| 3,731,059 A | 5/1973 | Wilson |
| D232,297 S | 8/1974 | Mantelet |
| 3,901,484 A | 8/1975 | Emster |
| 3,943,421 A | 3/1976 | Shibata et al. |
| 3,951,351 A | 4/1976 | Emster et al. |
| 4,120,616 A | 10/1978 | Dwyer et al. |
| D255,759 S | 7/1980 | Ernest |
| 4,285,473 A | 8/1981 | Williams |
| 4,568,193 A | 2/1986 | Contri et al. |
| 4,686,356 A | 8/1987 | Ueda et al. |
| 4,762,057 A | 8/1988 | Hirota et al. |
| 4,822,172 A | 4/1989 | Stottmann |
| 4,892,413 A | 1/1990 | Vats |
| 4,893,942 A | 1/1990 | Stottmann |
| 4,968,864 A | 11/1990 | Doi et al. |
| 5,085,375 A | 2/1992 | Haworth |
| 5,156,867 A | 10/1992 | Leuthold et al. |
| D336,590 S | 6/1993 | Barnard |
| 5,267,211 A | 11/1993 | Kobayashi et al. |
| 5,267,790 A | 12/1993 | Sutherland et al. |
| 5,273,358 A | 12/1993 | Byrne et al. |
| 5,297,475 A | 3/1994 | Borger et al. |
| 5,316,382 A | 5/1994 | Penaranda et al. |
| 5,347,205 A | 9/1994 | Piland |
| 5,363,746 A | 11/1994 | Gordon |
| 5,392,695 A | 2/1995 | Junkel |
| 5,417,152 A | 5/1995 | Harrison |
| 5,531,153 A | 7/1996 | Maruyama et al. |
| 5,533,797 A | 7/1996 | Gelber |
| 5,556,198 A | 9/1996 | Dickson, Jr. et al. |
| 5,562,020 A | 10/1996 | Shigeshiro |
| 5,577,735 A | 11/1996 | Reed et al. |
| 5,605,090 A | 2/1997 | Mantani et al. |
| 5,660,467 A | 8/1997 | Mineo et al. |
| 5,768,978 A | 6/1998 | Dorner et al. |
| 5,829,341 A | 11/1998 | Lin |
| 5,839,356 A | 11/1998 | Dornbush et al. |
| 5,967,021 A | 10/1999 | Yung |
| 6,069,423 A | 5/2000 | Miller et al. |
| 6,210,033 B1 | 4/2001 | Karkos, Jr. et al. |
| 6,336,603 B1 | 1/2002 | Karkos et al. |
| 6,364,522 B2 | 4/2002 | Kolar et al. |
| 6,402,365 B1 | 6/2002 | Wong |
| 6,499,873 B1 | 12/2002 | Chen |
| 6,595,113 B1 | 7/2003 | Chang |
| 6,609,821 B2 | 8/2003 | Wulf et al. |
| D480,915 S | 10/2003 | Kolar et al. |
| 6,680,551 B2 | 1/2004 | Bates et al. |
| 6,959,562 B2 | 11/2005 | Navedo et al. |
| 7,422,362 B2 | 9/2008 | Sands |
| D587,526 S | 3/2009 | Barnard et al. |
| D588,406 S | 3/2009 | Ulanski et al. |
| 7,619,188 B2 | 11/2009 | Oghafua et al. |
| D621,656 S | 8/2010 | Ulanski et al. |
| 8,087,603 B2 | 1/2012 | Kolar et al. |
| D662,359 S | 6/2012 | Boozer |
| D678,727 S | 3/2013 | Kolar et al. |
| 8,529,120 B2 | 9/2013 | Ulanski et al. |
| 8,814,011 B2 | 8/2014 | Ulanski et al. |
| 9,084,512 B2 | 7/2015 | Boozer |
| 2002/0009016 A1 | 1/2002 | Ancona et al. |
| 2002/0009017 A1 | 1/2002 | Kolar et al. |
| 2002/0176320 A1 | 11/2002 | Wulf et al. |
| 2003/0076739 A1 | 4/2003 | Brezovnik et al. |
| 2004/0203387 A1 | 10/2004 | Grannan |
| 2005/0068846 A1 | 3/2005 | Wulf |
| 2005/0229795 A1 | 10/2005 | Stuckey |
| 2006/0086843 A1 | 4/2006 | Lin et al. |
| 2006/0169715 A1 | 8/2006 | Emmendorfer et al. |
| 2006/0203610 A1 | 9/2006 | Bohannon, Jr. et al. |
| 2006/0214765 A1 | 9/2006 | Pitchers et al. |
| 2006/0007778 A1 | 12/2006 | Tai |
| 2007/0221668 A1 | 9/2007 | Baarman et al. |
| 2008/0031087 A1 | 2/2008 | Pryor |
| 2010/0014380 A1 | 1/2010 | Kolar et al. |
| 2010/0294142 A1 | 11/2010 | Durris et al. |
| 2011/0096619 A1 | 4/2011 | Pryor et al. |
| 2011/0108647 A1 | 5/2011 | Buzian |
| 2011/0149677 A1 | 6/2011 | Davis et al. |
| 2011/0189358 A1 | 8/2011 | Herbert |
| 2011/0199852 A1 | 8/2011 | Martin |
| 2011/0248108 A1 | 10/2011 | Carriere |
| 2014/0095479 A1 | 4/2014 | Chang |
| 2015/0059289 A1 | 3/2015 | Cody |
| 2015/0265983 A1 | 9/2015 | Fleming et al. |
| 2015/0272394 A1 | 10/2015 | Lin et al. |
| 2015/0305564 A1 | 10/2015 | Jimenez et al. |
| 2016/0045073 A1 | 2/2016 | Kozlowski et al. |
| 2016/0287018 A1 | 10/2016 | Thomas et al. |

FOREIGN PATENT DOCUMENTS

| | | |
|---|---|---|
| CN | 202261837 | 5/2012 |
| CN | 107051310 A | 8/2017 |
| JP | 61185228 | 8/1986 |
| JP | 05199941 | 8/1993 |
| JP | 56106031 | 11/2000 |
| JP | 2006269362 | 5/2006 |
| WO | 2005092158 | 10/2005 |
| WO | 2006104651 | 10/2006 |
| WO | 2014135249 | 9/2014 |

OTHER PUBLICATIONS

Supplementary European Search Report for Application No. 16752897.5 relating to PCT/US2016/018053, dated Nov. 14, 2018.

International Search Report and Written Opinion, PCT/US2014/029134, dated Aug. 1, 2014.

International Search Report and Written Opinion dated Mar. 1, 2018; International Patent Application No. PCT/US2017/059497, filed on Nov. 1, 2017. ISA/US.

BLENDING VOLUME REDUCING DEVICE

CROSS-REFERENCE TO RELATED APPLICATIONS

This application is a 35 U.S.C. § 371 national stage application of PCT Application No. PCT/US2017/059497 filed on Nov. 1, 2017, entitled "BLENDING VOLUME REDUCING DEVICE," which claims priority to U.S. Provisional Patent Application No. 62/415,535 entitled "Blending Volume Reducing Device," filed on Nov. 1, 2016, and U.S. Provisional Patent Application No. 62/514,330 entitled "Blending Volume Reducing Device," filed on Jun. 2, 2017, which are incorporated herein by reference in their entireties.

FIELD

This technology relates to blending enhancement tools, and more specifically, to a blending volume reducing device for a blender assembly.

BACKGROUND

Blenders are used to prepare food items by performing a blending operation on foodstuff. A blender can include a container for receiving food and a blade assembly that is rotatable to blend the food received within the container. The blending container can comprise a working volume that is defined by the volume of space within the container that is generally exposed to the blade assembly. In other words, the working volume is the volume of space within the container where food may be received and blended.

Sometimes, food items such as spices are placed in the container of a blender in order to be ground and incorporated into the other blended food. However, the working volume of the container is often larger than is optimal for the food item to be ground. For example, if not confined to a smaller volume, whole spices like peppercorns, cloves, etc., may bounce around the container during the grinding operation or coat the walls of the container. The spices will not be focused by the blades and extra spices may need to be added to get a preferred grind and yield.

Similarly, other foodstuff may be placed in the container of a blender in order to be blended. However, the working volume of the container is often larger than is optimal for foodstuff to be blended. For example, if not confined to a smaller volume, it may take longer than is desirable to blend a smoothie or any other kind of foodstuff.

Further, in moderate to high liquid ratio blending recipes, the efficiency of breaking down ingredients and/or increasing temperature rise may be slowed due to ingredients jumping and splashing around a large blending area. Therefore, there is a need to reduce the blending volume to decrease the time to heat the ingredients or otherwise just blend them.

SUMMARY

The following presents a simplified summary of the disclosure in order to provide a basic understanding of some example aspects described in the detailed description.

Described is a blending system comprising a container comprising side walls defining a cavity, a blade assembly disposed within the cavity, and a blending volume reduction device operatively insertable within the cavity. The blending volume reduction device comprises a cover member operatively contacting the side walls when inserted within the cavity to generally seal a working volume of the container, a handle extending from the cover member, and a pressure valve operatively sealing the working volume of the container from an external environment. The pressure valve comprises a plug movable between at least a first position and a second position. The handle comprises an actuator operatively connected to the plug and operatively translating the plug from the first position to the second position. In another aspect, the blending system may comprise at least one magnet disposed in the actuator. The at least one magnet repels the actuator from the handle. According to an example, the plug is generally semi-spherical in shape. The plug comprises an elastomeric material. In embodiments, the cover member comprises a first side operatively disposed towards a closed end of the container, a second side disposed opposite the first side, and an aperture formed through the first and second side. The second side slopes towards the aperture, and may be generally concave. The first side may be generally convex.

In another aspect, a blending volume reduction device is described and is operatively insertable within the cavity. The blending volume reduction device comprises a cover member comprising a first side, a second side, and an aperture formed through the first side and the second side, a handle extending from the second side, and a pressure valve operatively sealing the aperture. The cover member comprises an annular gasket disposed about the cover member. The pressure valve allows air to pass through the aperture while preventing solids or fluids from passing through the aperture. The plug member includes an elastomeric gasket.

A blending system includes a blending volume reducing device operatively insertable within a cavity of a container to alter a working volume of the container, and comprising a seal that operatively seals the working volume, a motor operatively controlling the seal, and one or more sensors operatively instructing the motor to alter a state of the seal. The one or more sensors comprise a motion sensor or a thermal sensor. The blending volume reducing device further comprises a wireless transmitter disposed within the blending volume reducing device.

The following description and the drawings disclose various illustrative aspects. Some improvements and novel aspects may be expressly identified, while others may be apparent from the description and drawings.

BRIEF DESCRIPTION OF THE DRAWINGS

These and other features, aspects and advantages of the present disclosure are better understood when the following detailed description is read with reference to the accompanying drawings, in which.

DETAILED DESCRIPTION

Figure 1:
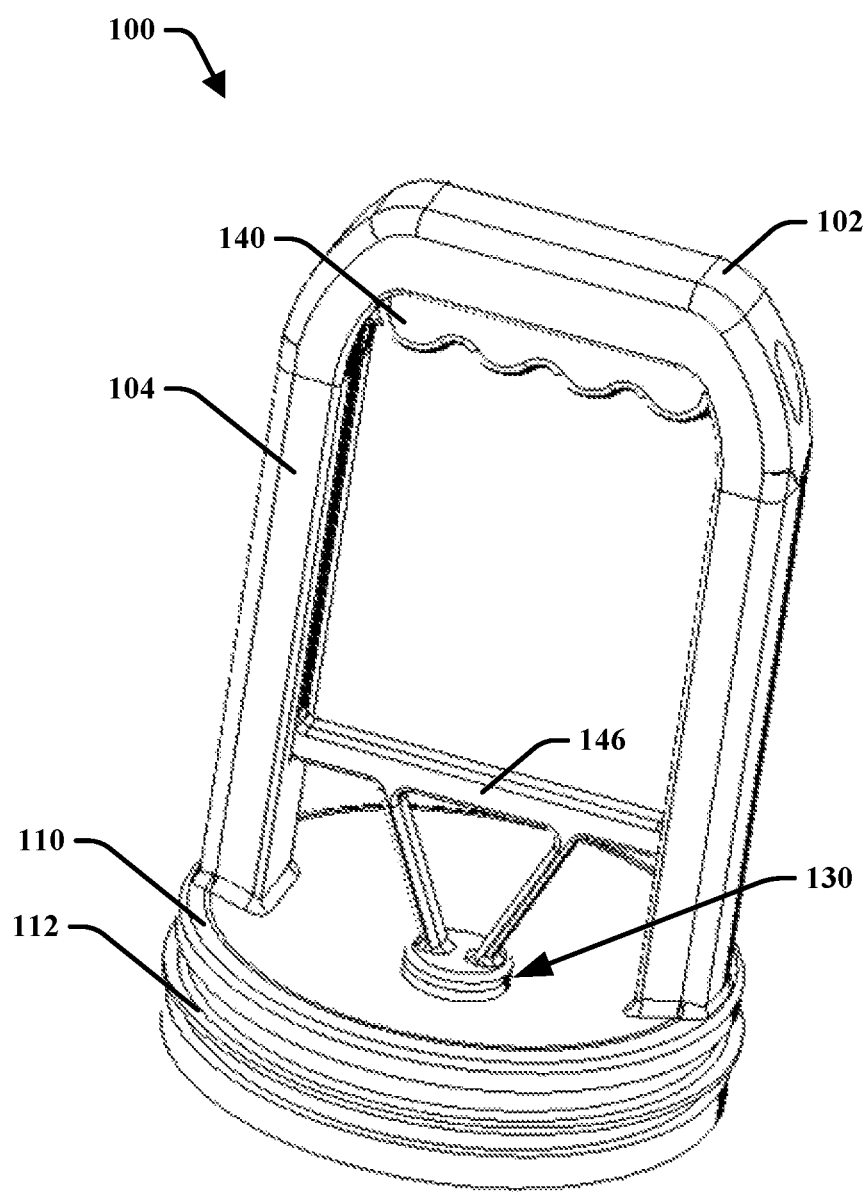
FIG. 1 is a prospective view of a volume reducing device, in accordance with various disclosed aspects.
Figure 2:
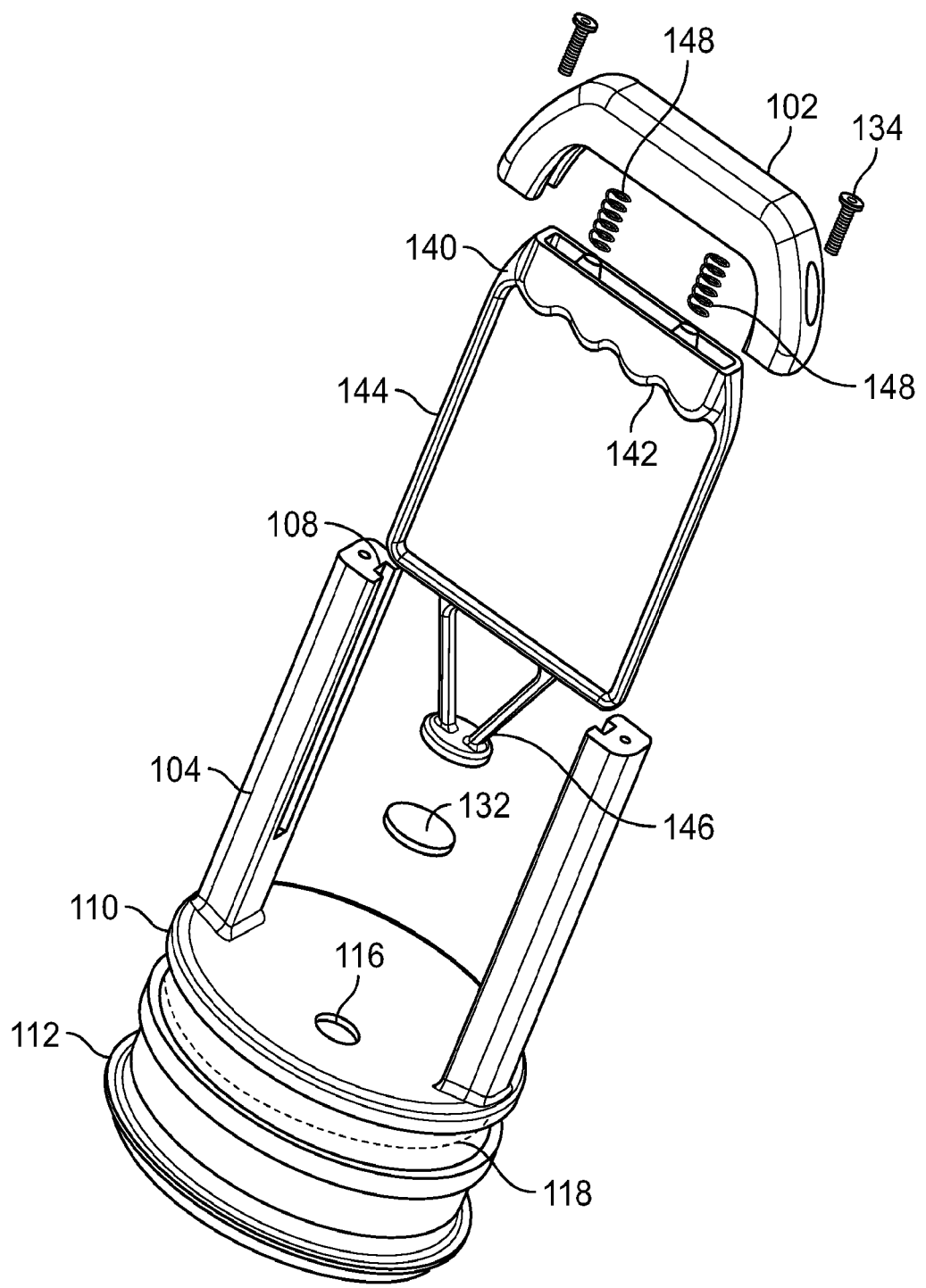
FIG. 2 is an exploded view of the volume reducing device of FIG. 1, in accordance with various disclosed aspects.
Figure 3:
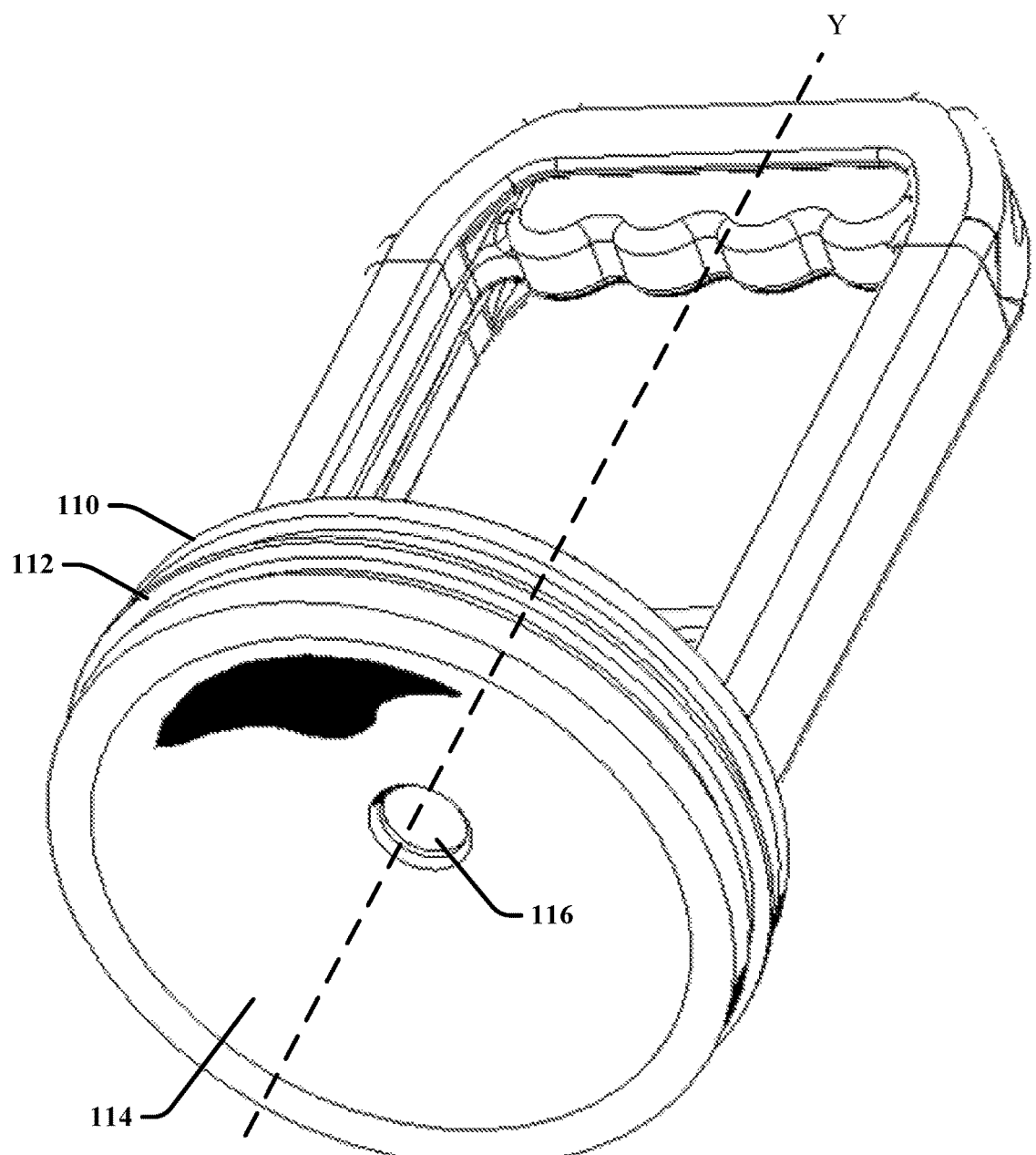
FIG. 3 is a bottom, prospective view of the volume reducing device of FIG. 1, in accordance with various disclosed aspects.
Figure 5:
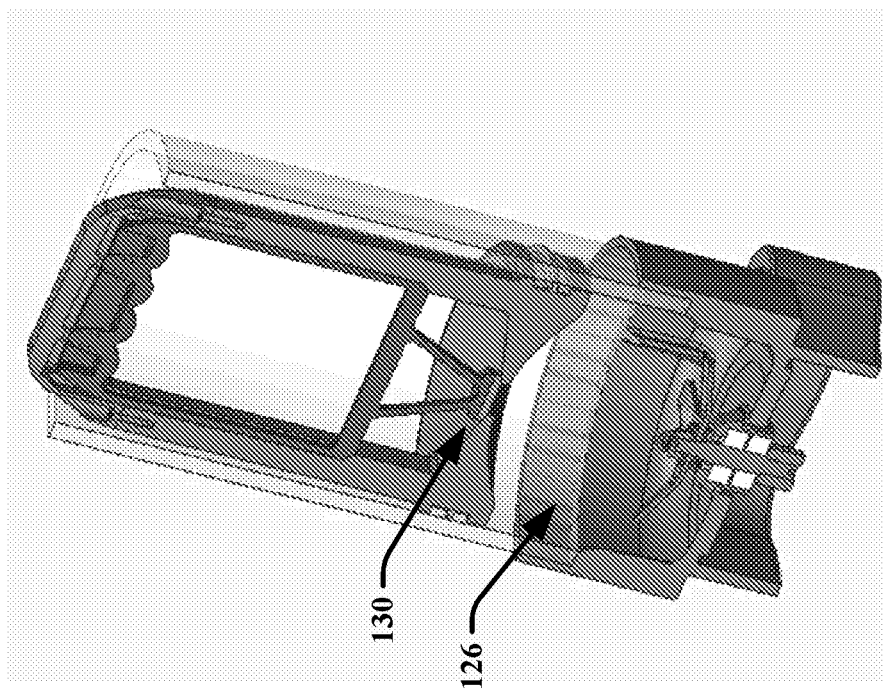
FIG. 5 is a cross-sectional view of a blender system comprising a container and a volume reducing device in a closed position, in accordance with various disclosed aspects.

Examples will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

It is noted that the various embodiments described herein may include other components and/or functionality. It is further noted that while various embodiments refer to a blender or a blender system, various other systems may be utilized in view of embodiments described herein. For example, embodiments may be utilized in food processor systems, mixing systems, hand-held blender systems, various other food preparation systems, and the like. As such, references to a blender, blender system, and the like, are understood to include food processor systems, and other mixing systems. Such systems generally include a blender base that may include a motor, a controller, a display, a memory and a processor. Further, such systems may include a container and a rotating assembly, e.g., a blade assembly, which may be configured to manipulate, mix, agitate, or otherwise blend a product. The blade assembly, the container, and the blender base may removably or irremovably attach. The container may be powered in any appropriate manner, such as disclosed in U.S. patent application Ser. No. 14/213,557, entitled Powered Blending Container, which is hereby incorporated by reference.

Foodstuff may be added to the blending container. Furthermore, while blending of "ingredients," "contents" or "foodstuff" is described by various embodiments, it is noted that non-foodstuff may be mixed or blended, such as paints, epoxies, construction material (e.g., mortar, cement, etc.), and the like. Further, the blender systems may include any household blender and/or any type of commercial blender system, including those with covers that may encapsulate or partially encapsulate the blender. Further, commercial blender systems may include an overall blender system, such as a modular blender system that may include the blender along with other components, such as a cleaner, foodstuff storage device (including a refrigerator), an ice maker and/or dispenser, a foodstuff dispenser (a liquid or powder flavoring dispenser) or any other combination of such.

Moreover, blending of foodstuff or ingredients may result in a blended product. Such blended products may include drinks, frozen drinks, smoothies, shakes, soups, purees, sorbets, butter (nut), dips or the like. It is noted that various other blended products may result from blending ingredients. Accordingly, terms such as "blended product" or "drink" may be used interchangeably unless context suggests otherwise or warrants a particular distinction among such terms. Moreover, such terms are not intended to limit possible blended products and should be viewed as examples of possible blended products.

Some traditional blenders include containers with lids and a blender base. The containers typically come in fixed sizes or capacities. These fixed size containers have a fixed working volume. Users may desire different working volumes for different blending processes. For instance, a user may need a larger working volume when mixing a large amount of foodstuff. Likewise, the user may desire a smaller working volume when mixing a smaller amount of foodstuff. Users would generally use different sized containers to address their needs. In another example, a user may desire to blend foodstuff to make a hot or warm product—such as a soup, warm beverage or the like. Having a larger working volume may require an increased amount of time or energy to heat the foodstuff in comparison with a smaller working volume.

According to embodiments disclosed herein, a blender system may include a volume reducing device comprising a pressure releasing valve. The volume reducing device is operatively inserted within a blending container to reduce the working volume of the blending container. Reducing the volume of the blending container may alter the amount of time needed to complete a blending program or process. For example, reducing the working volume may reduce the amount of time needed to impart heat, reach a desired blend consistency, or the like. In another aspect, reducing the working volume may allow a blender system to blend products more efficiently, to consistencies not previously available, or the like.

In another aspect, described volume reducing devices may form a seal with a blending container to seal or pressurize a working volume. The seal may allow the pressure to increase within the working volume. A volume reducing device may include a pressure release valve that may break a seal or otherwise allow for pressure to be released. The valve may be controlled by a mechanical actuator, electronic actuator, or the like. It is noted that the actuator may be manual (e.g., user controlled) and/or automatic (e.g., controlled without user intervention). It is further noted that described volume reducing devices may comprise aspects as described with reference to U.S. Patent Pub. No. 2016/0045073 entitled "Blending Volume Reducing Device, the entirety of which is incorporated by reference herein.

Figure 15:
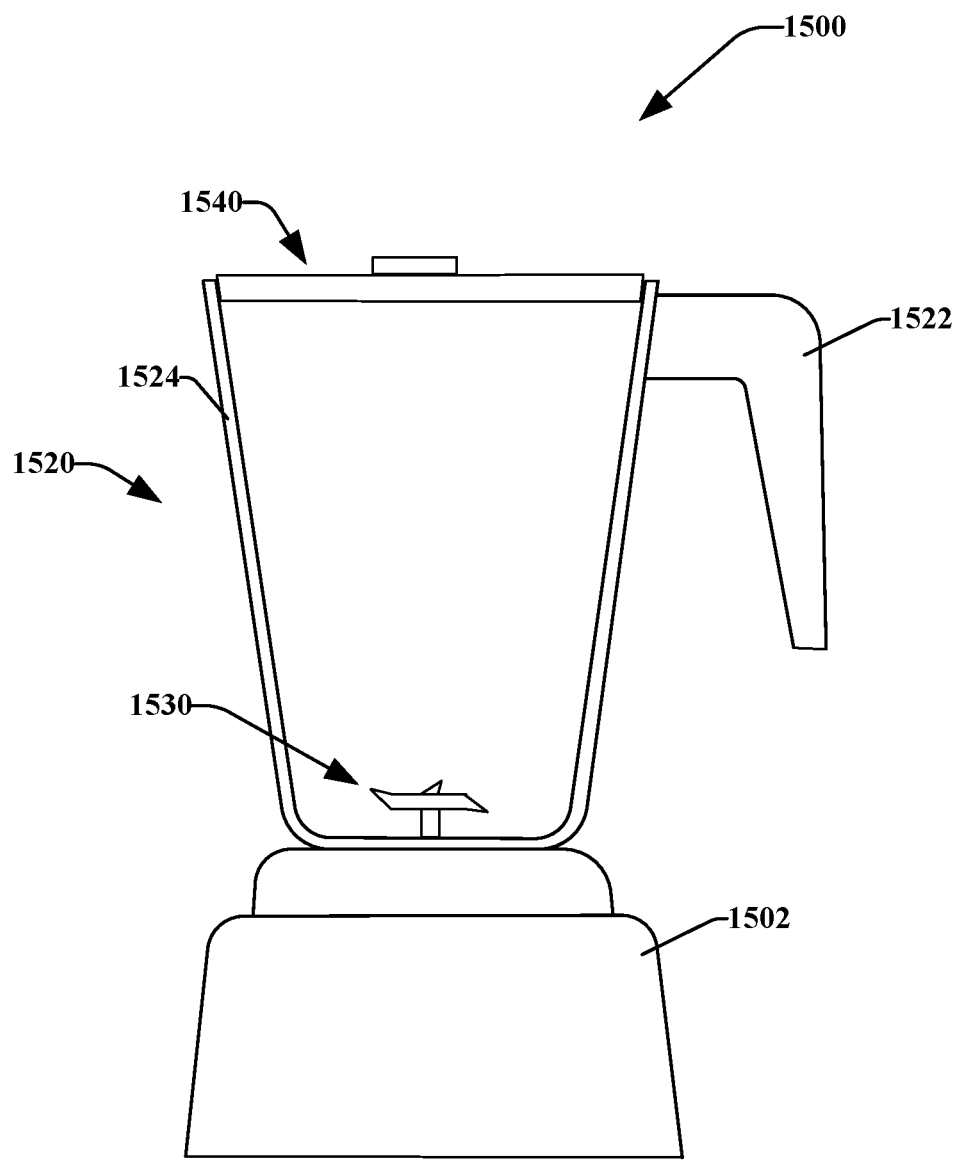
FIG. 15 is a front view of the blending system usable with volume reducing devices, in accordance with various disclosed aspects.

With reference now to the accompanying drawings, a volume reducing device 100 including a vent and usable with a blender system (e.g., as shown in FIG. 15) is illustrated in FIGS. 1-7. The volume reducing device 100 may be inserted within a container to reduce the working volume of the container. It is noted that while embodiments may refer to different members or parts, such members may be monolithically formed and/or may comprise a single component. Moreover, it is noted that modifications and variations are considered within the scope and spirit of this disclosure. For instance, a volume reducing device 100 may comprise multiple valves, gaskets, seals, or the like.

As depicted, volume reducing device 100 may include a handle 102 and a shield or body 110. A user may grasp the handle 102 and position the body 110 within a blender container 160. The body 110 and/or handle 102 may comprise various shapes and dimensions. For instance, the handle 102 may include one or more arms 104. In another aspect, the body 110 and/or handle 102 may comprise materials, such as food grade plastics, metals, glass, wood, rubbers, and the like—which may include polyesters and copolyester (e.g., TRITAN). It is noted that the body 110 may be monolithically formed with handle 102, may be attachable (e.g., irremovably or removably) with handle 102, separately insertable in the container 160, or the like. Moreover, handle 102 may be adjustable in height, may lock with body 110, or the like.

It is noted that the body 110 may be generally cylindrical, frustoconical, polygonal, irregular in shape, or any desired shape. The shape and size of body 110 may be selected based on a shape and size of container 160. For instance, container 160 may be generally cylindrical, rectangular, variable (e.g., transition from rectangular to cylindrical), or other desired shapes. As such, the body 110 may be sized and shaped to generally match the shape of the container. It is noted, however, that body 110 may be differently shaped than the container. Moreover, other components may be utilized (e.g., such as inserts or attachments) to allow differently shaped containers and bodies to mate and/or form a seal.

Container 160 may comprise a pitcher, bowl, cup, or other general shape. It is noted that the blending container may be configured for single serving use, commercial use, multiserving use, or the like. The container 160 may include or be coupled with (e.g., removably or irremovably) a blade assembly 170. The blade assembly may include one or more blades having one or more wings. The container 160 further comprises a working volume 126 that is defined by the volume of space within the container 160 that is exposed to the blade assembly 170 or otherwise may comprise contents to be blended by the blade assembly 170. In other words, the working volume 126 is the volume of space that food may be received within the container 160 for blending.

According to at least one embodiment, body 110 may include a first or bottom surface 114. The bottom surface 114 may be generally flat, curved (e.g., concave or convex), or other desired shapes. Bottom surface 114, in an example, may be concave towards an opening or aperture 116. The bottom surface 114 may generally face or be directed towards foodstuff within the container 160. As such, the bottom surface 114 may comprise a non-stick surface or coating. It is noted that the bottom surface 114 may include other or different features. For instance, the bottom surface 114 may include one or more protrusions (not shown) extending in the direction of a foodstuff when the volume reducing device 100 is inserted within container 160. The protrusions may disrupt the flow of foodstuff to reduce or eliminate the formation of a vortex within the working volume of the container 160. In another example, bottom surface 114 may comprise an elastomeric material that may form a seal with a container.

Body 110 may include a sealing member or gasket 112 disposed about a periphery 118 of the body 110. The gasket 112 may comprise elastic, anelastic, viscoelastic, or other material that may be deformed to create a tight fitting seal. In embodiments, the material may comprise rubbers, foams, plastics, or the like. It is noted that the "seal" may be an airtight seal, water or liquid-tight seal, or the like. The gasket 112 may be operatively attached (e.g., removably or irremovably) to the body 110. For example, the gasket 112 may comprise a rubber material that may be stretched and placed on the periphery 118. The gasket 112 may then contract to form a tight or friction fit with the body 110. In another example, the gasket 112 may be glued, adhered, or otherwise coupled to the body 110. It is noted that various other mechanisms may be utilized to attach the gasket 112 to the body 110, such as overmolding, chemical disposition, magnetic attachment, or the like. In at least one embodiment, as described in FIGS. 6 and 7, gasket 112 may be disposed within a grove 120 of the body 110. The groove 120 may generally align gasket 112 and maintain gasket 112 in its alignment. It is further noted that the body 110 may comprise or support other or different gaskets 112. For example, body 110 may itself comprise an elastomeric material, such that the periphery 118 may form a seal with the container 160.

As described herein, the body 110 may be inserted within the container 160. The body 110 and/or gasket 112 may tightly-fit or friction-fit with the inner periphery 162 of the container 160. Gasket 112 may comprise a flange 122 that may extend past a furthest point 103 of body 110 as measured from a general center of the body 110. In an example, body 110 may comprise an outer perimeter 124 that may be generally equal to or slightly smaller than the inner perimeter 162 of the container 160. As the flange 122 extends past the outer perimeter 124, the perimeter of the flange 122 may be generally equal to or greater than the inner perimeter 162 of the container 160. This may result in the flange 122 being compressed or otherwise deformed. The deformation may place pressure on the container 160 such that a seal is formed.

While body 110 is described as pressing radially towards container 160, various other mechanisms may be utilized to hold the body 110 in place. Such mechanisms may include fasteners, magnets, stops (e.g., physical formations), or the like. For instance, container 160 may include hooks that are secured to top edges of the container's side walls, a handle, and/or a cover of the container 160. The hooks may hook to the volume reducing device 100. In another example, the volume reducing device 100 may be additionally or alternatively supported by legs, stops, or other formations within the container 160. It is noted that the above mechanisms may prevent volume reducing device 100 from contacting the blade assembly 170.

It is noted that the embodiments may include one or more gaskets of other shapes, sizes, and configurations. In embodiments, gasket 112 may be sized such that it may form a seal with a container with side walls that are not normal or perpendicular with the horizontal. For instance, container 160 may comprise walls that are slanted or otherwise configured such that the inner perimeter 162 decreases towards a bottom of the container 160 (e.g., conical containers, or the like). As such, gasket 112 may be sized and shaped such that it may form a seal at various positions within the container 160 and/or with various differently shaped or sized inner perimeters 162.

Figure 4:
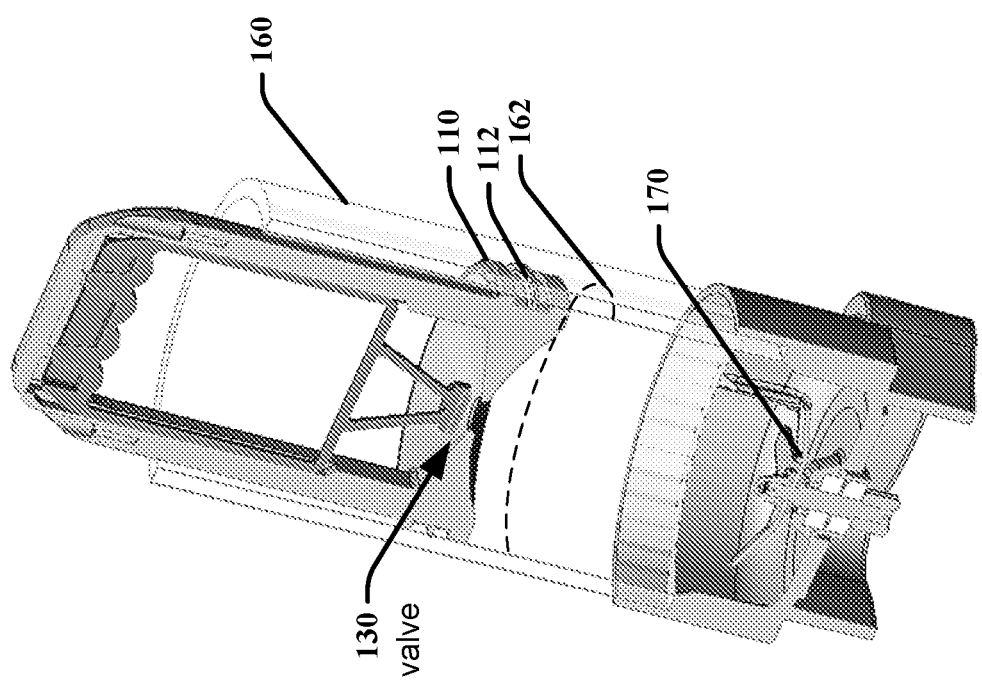
FIG. 4 is a cross-sectional view of a blender system comprising a container and a volume reducing device in an open position, in accordance with various disclosed aspects.
Figure 7:
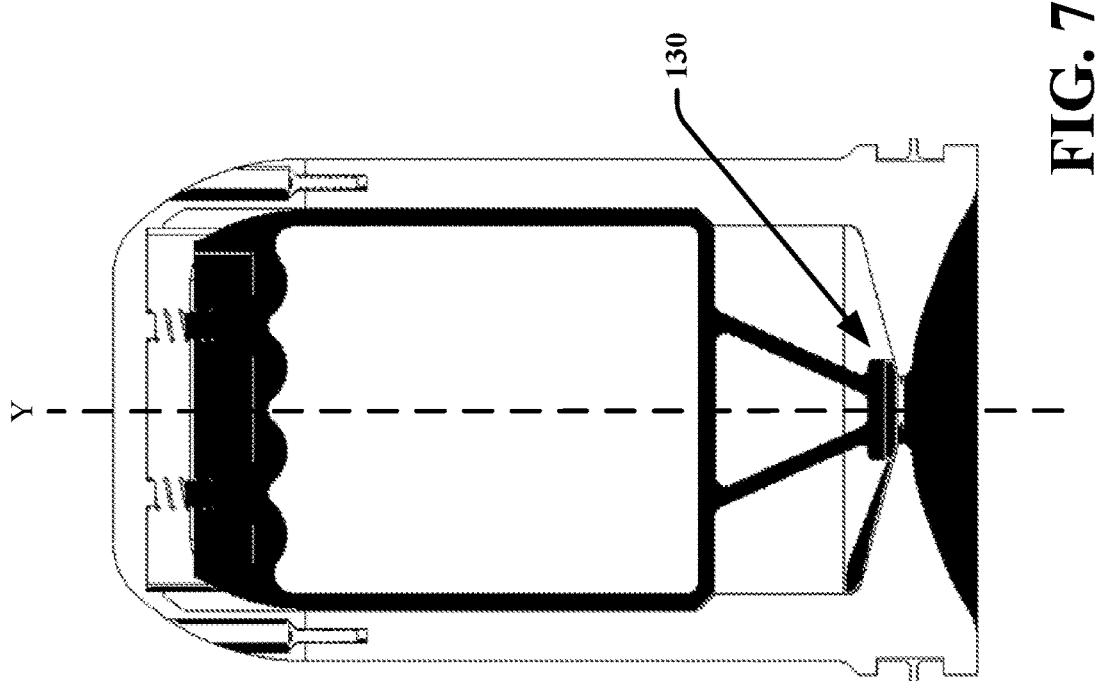
FIG. 7 is a cross-sectional view of a volume reducing device in a closed position, in accordance with various disclosed aspects.
Figure 6:
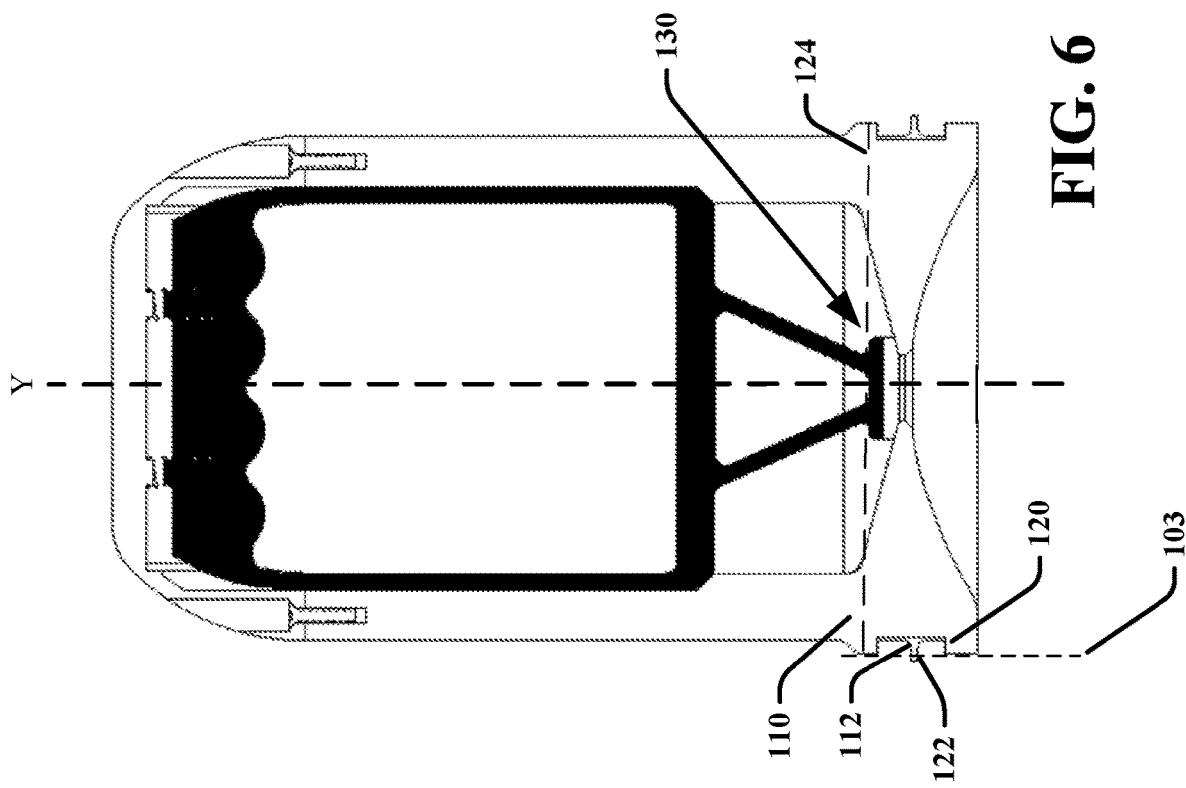
FIG. 6 is a cross-sectional view of a volume reducing device in an open position, in accordance with various disclosed aspects.

Volume reducing device 100 may include a pressure valve 130 that may allow for release of pressure via an actuator 140. The actuator 140 may operatively actuate the valve 130 between states, such as an open state and a closed state. As shown in FIGS. 4 and 6, in an open state, valve 130 may allow air to flow through aperture 116 of the body 110. In a closed state—shown in FIGS. 5 and 7—the valve 130 may form a seal with the aperture 116 to prevent air flow or pressure release. In an example, a user may squeeze the handle 102 and actuator 140 to open the valve 130. When the user releases the handle 102 and/or actuator 140, the valve 130 may close. It is noted that while embodiments may be described with reference to a single valve, other embodiments may comprise other or different valves. Moreover, other or different actuators may be utilized, such as buttons, powered (e.g., electrically powered), cranks, or the like.

Actuator 140 may predominantly comprise an interface or gripping portion 142 (which may allow a user to interact with the actuator 140), a frame 144 (which may support portions of the actuator 140), a valve arm 146, and one or more biasing members 148. Biasing members 148 may comprise one or more springs that may bias the actuator 140 in a particular position. It is noted that biasing members 148 may include m biasing members, where m is a number. In an aspect, the biasing members 148 may include coiled springs, magnets, weights, spring tabs, elastomeric materials (e.g., rubber), or the like. The biasing members 148 may bias the actuator 140 from handle 102 and/or body 110, such that the actuator 140 opens or closes the valve 130. While biasing members 148 are shown as disposed between gripping portion 142 and handle 102, the biasing members may be disposed within arm 104, between arm 104 and frame 144, or the like. Accordingly, various modifications are considered within the scope and spirit of this embodiment.

In another aspect, gripping portion 142 may comprise a portion of actuator 140 configured for interaction with a user. In an aspect, the gripping portion 142 may be comprised of a molded plastic, a pad, or the like. This may include an ergonomically-shaped portion of frame 144, a button, or the like. Frame 144 may connect gripping portion 142 to a valve arm 146. As such, movement of the gripping portion 142 may displace the frame 144 and the valve arm 146. In embodiments, the frame 144 may be disposed within or guided by one or more grooves or channels 108 within the arm 104. The channels 108 may align the actuator 140 and/or allow the actuator to move in a desired direction. In an aspect, the actuator may be held within the channels 108 via one or more fasteners 134 that may fasten the handle 102 to the arms 104. It is noted that embodiments may include other mechanisms for securing the actuator 140, such as molding the handle 102 to the arms 104 or the like.

Valve arm 146 may be operatively attached to a plug 132. Plug 132 may be adhered to or otherwise attached to valve arm 146, such as via magnets, overmolding, or the like. In embodiments, the plug 132 may comprise an elastomeric material or other material that may form a seal with aperture 116. For instance, aperture 116 may comprise a rubber or plastic material that forms a seal with a rigid plug 132. Moreover, the aperture 116 and plug 132 may be configured for a friction-fit or close-fit. The biasing members 148 may apply pressure to the plug 132 (e.g., via actuator 140) to such that the plug 132 and aperture 116 are pressed or sealed together. A user may manipulate the actuator 140 to break the seal by translating the plug 132 away from the aperture 116. As described herein, actuator 140 may comprise various modifications. Thus, while plug 132 may be shown as translating above body 110, it is noted that the plug 132 may be disposed below the body 110 (e.g., proximal bottom surface 114), such that actuation of the actuator 140 may translate the plug 132 below the body 110. According to another embodiment, the plug 132 may be slid within the body 118 or otherwise displaced. In an aspect, the valve 130 may refer to at least one of the plug 132, aperture 116, and/or actuator 140. It is noted, however, that valve 130 may comprise other configurations or mechanisms.

The aperture 116 may be shaped, sized, and disposed in various manners. For instance, the aperture 116 may be disposed near a center or axis Y of the volume reducing device 100. The aperture 116 may be generally cylindrical (e.g., circular), an n-sided polygon (where n is a number), irregular in shape (e.g., such as a portion of a cylindrical shape), or the like. In another aspect, the aperture 116 may be formed orthogonally through the body 110 and/or at other angles. In another aspect, the aperture 116 may be threaded, or the like, and may be configured to mate with the plug 132 (which may be threaded to mate with a threaded aperture 116). In at least one example, the plug 132 may be positioned in the aperture 116 and/or may cover the aperture 116. For instance, the plug 132 may be configured to cover the aperture 116 without being positioned therein. It is noted that volume reducing device 100 may comprise other or different apertures (e.g., more, less, differently shaped, etc.).

The handle 102 may assist the user with manipulating the volume reducing device 100 into and out of the container 160. Further, the handle 102 may allow a user to break any kind of seal that may be created during the blending operation, especially the seal between the blending volume reducing device 100 and the container 160. For example, the working volume 126 may become pressurized during a blending process. The user may utilize handle 102 to manipulate the blending volume reducing device 100 and break a seal to release the pressure.

It is noted that the handle 102 may be monolithically formed with the body 112, may be selectively attached thereto (e.g., removably or irremovably), or the like. It is further noted that the handle 102 may be utilized with other embodiments described herein. For instance, handle 102 may be selectively attached to volume reducing device 100, such as via aperture 116. It is noted that the handle 102 may be monolithically formed with the body 110 and/or may be attachable (e.g., removably or irremovably) to the blending volume reducing device 100. In at least one aspect, the handle 102 may plug or cover an aperture formed through the body 112. It is further noted that the handle 102 may be coupled to or comprise one or more arms 104, as described herein. Such arms 104 may generally couple the handle 102 to the body 110. Moreover, the arms 104 may comprise a fixed length and/or may be adjustable in length.

Turning to FIGS. 4-7, there are various depictions of volume reducing device 100 with valve 130 in a closed position (e.g., FIGS. 5 and 7) and an open position (e.g., FIGS. 4 and 6). As described herein, when at rest, the actuator 140 may be biased or forced downward (relative to the figures) via the biasing members 148. The downward force may cause valve arm 146 to apply pressure to plug 132. The plug 132 may form a seal with the aperture 116. A user may grasp the handle 102 and the grip portion 142 of the actuator 140. The user may apply pressure to squeeze the handle 102 and the grip portion 142. This pressure may cause the actuator 140 to translate towards the handle 102. As the actuator 140 translates, the valve arm 146 may lift the plug 132. The plug 132, in response, may break the seal formed with the aperture 116. This may allow air or pressure to escape from the working volume 126.

In an example, the user may allow the air to escape from the working volume 126 as the volume reducing device 100 is moved (e.g., repositioned, removed, inserted, etc.) within the container 160. Once the user placed the volume reducing device 100 in a desired location within container 160, the user may close the valve 130. A desired location may comprise a location where bottom surface 114 generally touches the foodstuff, a location where bottom surface contacts a stop (not shown) of the container, or any other desired location. The user may turn the blender on to cause the blade assembly 170 to blend foodstuff. For instance, the user may select a process to blend and heat foodstuff to make a soup. The sealed and reduced volume of the working volume 126, relative to blenders without the volume reducing device 100, may reduce the amount of time needed to reach a desired blend consistency, impart heat within the foodstuff (e.g., when making soup or the like), or otherwise blend foodstuff more efficiently. The user may break the seal with actuator 140 when the blending process is complete or when the user otherwise desires to move the volume reducing device 100. In some embodiments, the position of aperture 116 may allow a user to release heat or steam and avoid contact with the heat/steam.

In another example, smoothie ingredients (e.g., fruit, ice, vegetables, etc.) or other food may be provided in the working volume 126 before the volume reducing device 100 is positioned into the container 160. In addition or in the alternative, aperture 116 may be sized and shaped such that a user may insert foodstuff in the working volume 126 by opening the valve 130 and depositing foodstuff through the aperture 116.

The blending volume reducing device 100 is particularly useful in blending smoothies. The blending volume reducing device 100 may reduce the amount of air that is in the working volume 126. By reducing the amount of air therein, when the blending operation begins additional shear forces may be created. This may create a pump-like action whereby the foodstuff is more efficiently and effectively blended. By way of a non-limiting example, the total time to blend a smoothie may be reduced to approximately six or eight seconds. It is, of course, noted that the time may depend on the type of ingredients, amount of ingredients, or the like. In an aspect, the blending time may be reduced by about 60%-70% of the time a traditional blender would need. The volume reducing device 100 may by positioned until it comes into contact with the foodstuff disposed therein. The user may then begin the blending process. In another aspect, the volume reducing device 100 may be locked or secured in a desired position, may contact hard stops. In at least one embodiment, the volume reducing device 100 may be locked via friction, fasteners, stops, or other mechanisms as described herein.

It is noted that volume reducing device 100 may be positioned for various amounts of ingredients within working volume 126. This may be useful in a situation in which a user wishes to make different sized drinks (such as smoothies) or the like. The user merely needs to add the appropriate amount of foodstuff into the container and insert the blending volume reducing device 100 until it is adjacent to or otherwise in contact with the foodstuff. This way, a single container and blending volume reducing device may create a plurality of different sized drinks. In another aspect, the position of the volume reducing device 100 may indicate the amount of foodstuff within the working volume 126. For instance, arms 104, container 160, or other components may comprise indicia that indicate a measured volume of the working volume 126. Based on the position, the amount of ingredients in the working volume 126 may be determined.

As described herein, the volume reducing device 100 may include one or more sensors (e.g., temperature, proximity, vibration, pressure, etc.) that may sense or measure parameters for blending. It is further noted that the volume reducing device 100 may communicate with other components of a blending system, such as through an NFC device, inductive coils, or the like. For example, the volume reducing device 100 may include an NFC device and a blender base may include its own NFC device. When the volume reducing device 100 is operatively disposed within the container at a threshold distance, the NFC device of the container may sense or communicate with the NFC device of the volume reducing device 100. The blender device may determine appropriate blending programs to allow, select, or prevent. For instance, the blender device may disable a soup program when the volume reducing device 100 is sensed. It is further noted that the volume reducing device 100 may communicate information with blender device, such as sensed information.

Figure 8:
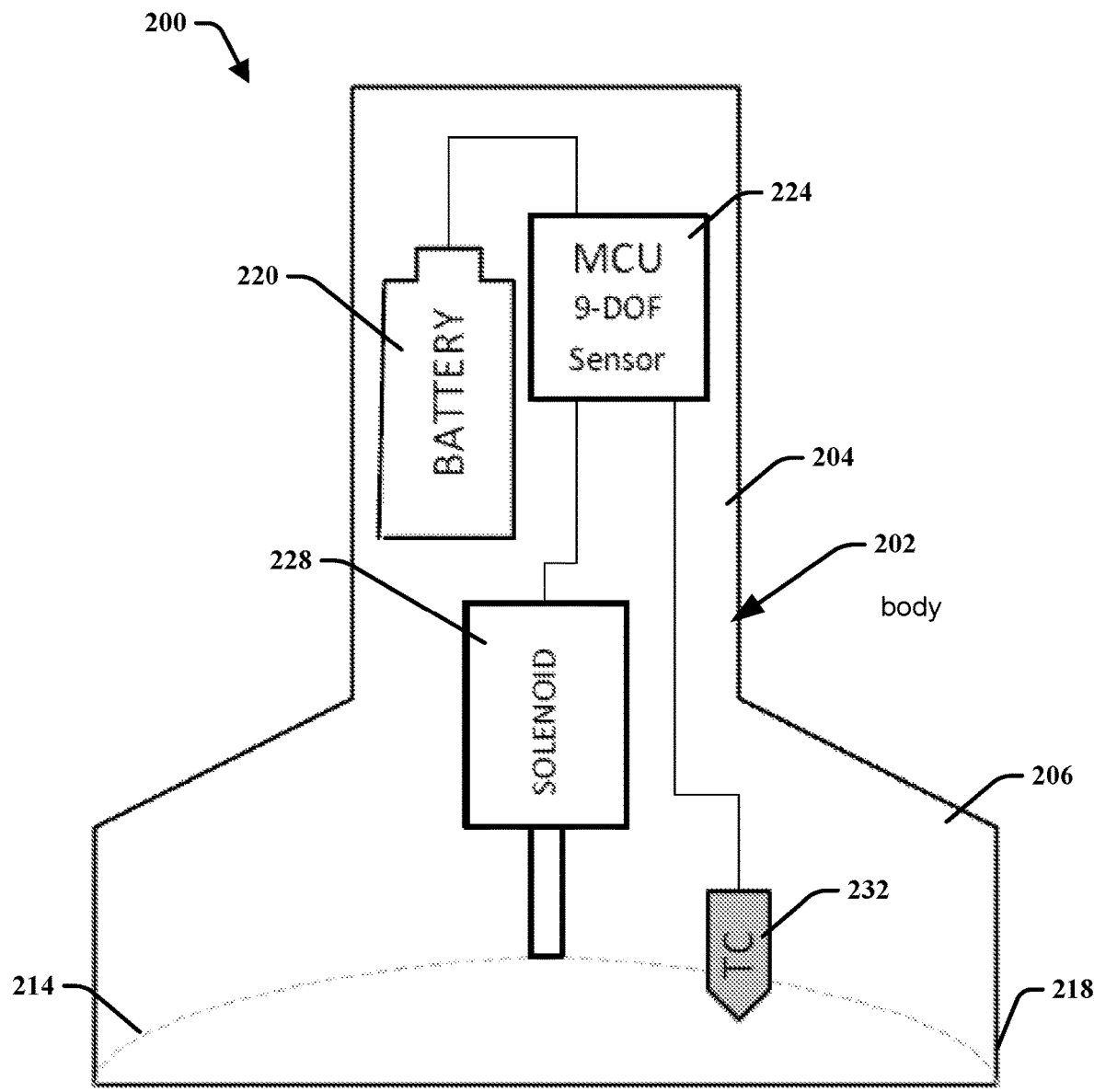
FIG. 8 is a schematic of a powered volume reducing device, in accordance with various disclosed aspects.

Turning now to FIG. 8, there is a powered volume reducing device 200 that may comprise one or more sensors utilized to automatically adjust a pressure within a working volume (not shown) of a container (not shown). The volume reducing device 200 may primarily include a housing 202 that houses various operative components, such as power source 220, sensor(s) 224, motor 228, and/or sensor 232. The housing 202 may comprise various sizes and shapes in accordance with the various disclosed embodiments. Housing 202 may comprise any suitable materials, such as plastic, metal, glass, rubber, wood, or the like. In another aspect, housing 202 may comprise a gripping or handle portion 204, and a seal body portion 206. The volume reducing device 200 may be placed within a blender container, and the motor 228 may automatically control the state (e.g., close or open) of a seal 214 as described in more detail herein. The motor 228 may be powered by the power source 220. The power source 220 may comprise a batter, an induction coil, power mains, or the like.

The volume reducing device 200 may be placed in a container by a user, automated or robotic assembly, or the like. In an aspect, the volume reducing device 200 may be part of a larger blending system. For instance, a blending system may include a blender base, a blender container, a blender lid, a cover, or other components. In another aspect, a blending system may include an automated blending system. According to exemplary embodiments, the volume reducing device 200 may be attached to a lid, a cover, or the like. When a user closes the lid or cover, the volume reducing device 200 may be disposed within the container. In an example, the handle 204 may comprise a telescoping handle that may comprise an adjustable length. In other embodiments, a user may manually position the volume reducing device 200 in the blender container.

The sensor 232 may determine or detect when the volume reducing device 200 is in a position at which it should maintain for a blending process. For instance, the sensor 232 may comprise a thermocouple sensor. The thermocouple sensor may detect temperature change. In an example, the thermocouple sensor may determine whether the seal 214 is in contact or proximal to a cold substance (e.g., ice, ice-cream, etc.) or a hot substance (e.g., hot coffee, heated water, etc.). It is noted that the thermocouple sensor may be configured to detect temperatures within a desired range. In another aspect, the thermocouple sensor may be configured to operate according to a cold or warm sensing mode.

It is noted that various additional or other sensors may be utilized. For instance, sensor 232 may comprise a proximity sensor that may detect proximity to foodstuff, a portion of a blender container (e.g., blade assembly, stop or ledge of the container, or the like). Sensor 232 may additionally or alternatively include light sensors, cameras, touch sensors, RFID sensors, NFC sensors, of the like.

When the sensor 232 determines the seal 214 is in a desired position, the sensor 232 may activate the motor 228, which may be powered by the power source 220. The motor 228 may include a solenoid configured to close or open the seal 214. For instance, the motor 228 may open or close a valve (not shown) that may control whether air or pressure may be relieved from a working volume. In another aspect, the motor 228 may manipulate the seal 214. For instance, the seal 232 may comprise an elastomeric material (e.g., rubber, plastic, etc.). The seal 232 may be curved (e.g., concave or convex). The motor 228 may apply pressure to the seal 232 to cause the seal 232 to flex radially outwards (e.g., towards a container wall). In an aspect, the pressure from the seal 232 against the container may form a seal that may be air or water tight. The motor 228 may open the seal 232 by applying force to bend or flex the seal in the opposite direction. For instance, the motor 228 may pull the seal 232 upwards such that pressure is relieved or reduced.

It is noted that various embodiments may utilize other or different seals or valves. For example, a perimeter of the body 206 may comprise a gasket that may form a seal with a container wall. The motor 228 may press or force the gasket against the container wall to form a seal. In another example, the volume reducing device 200 may include a valve (not shown) controlled by the motor 228. The motor 228 may open or close the valve as described herein.

Sensor 224 may monitor parameters of a blender system to determine when a blending process is complete. In an aspect, the sensor 224 may comprise a motion sensor. The motion sensor may include gyroscopes, accelerometers (e.g., single axis, multi-axis, etc.), or the like. A motion sensor may include an n-Degrees of Freedom (n-DOF) sensor, such as a 6-DOF, 9-DOF, or the like. The sensor 224 may monitor motion and vibrations to determine whether a blender is running a blender operation. The sensor 224 may analyze the motion and vibrations to determine when a blender process begins and/or ends. In an example, if the blending process ends, the sensor 224 may instruct the motor 228 to open the seal 214. In response, the motor 228 may open the seal as described herein.

Figure 9:
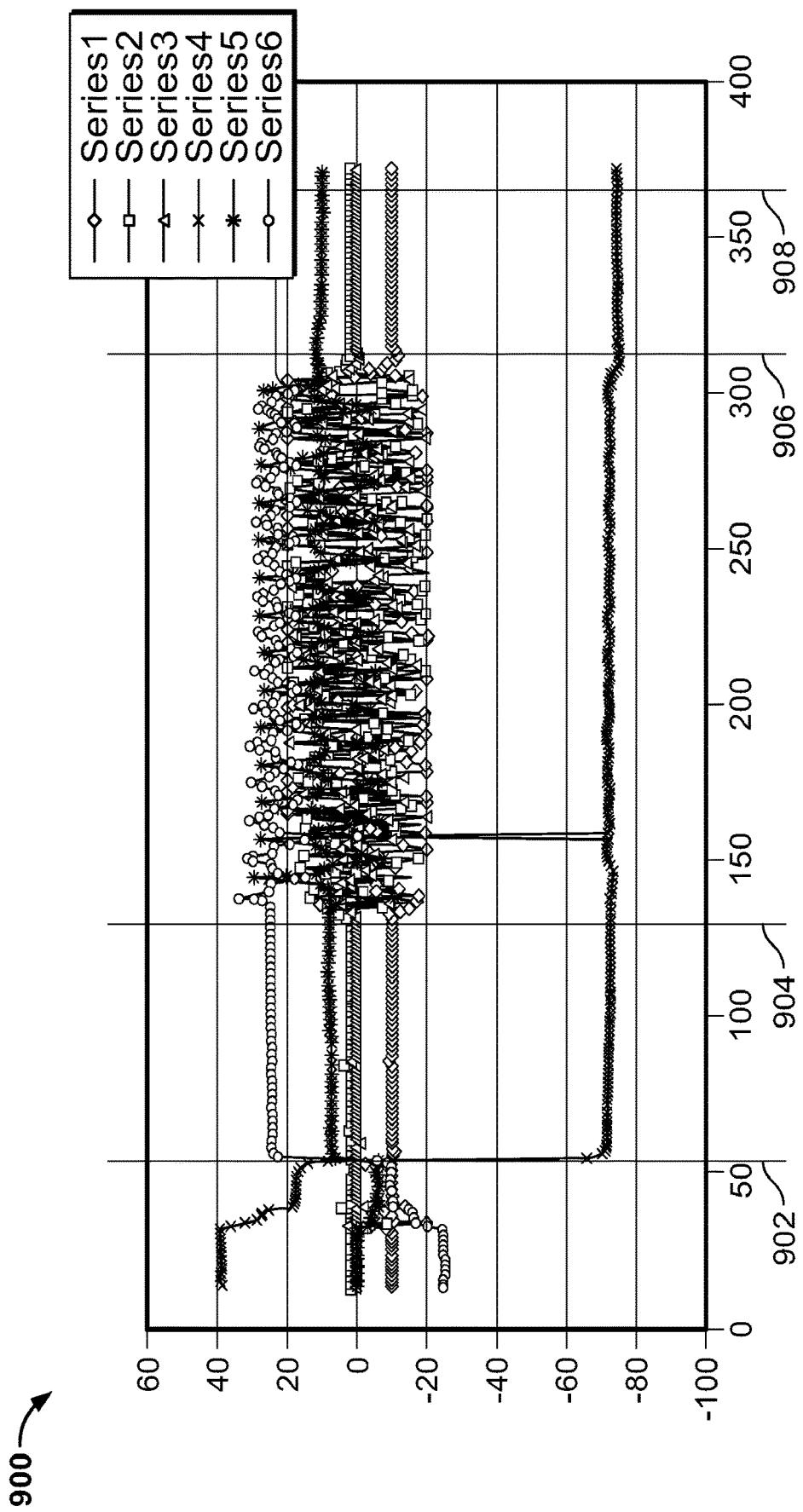
FIG. 9 is a graph of a sensor readout of a powered volume reducing device, in accordance with various disclosed aspects.
Figure 10:
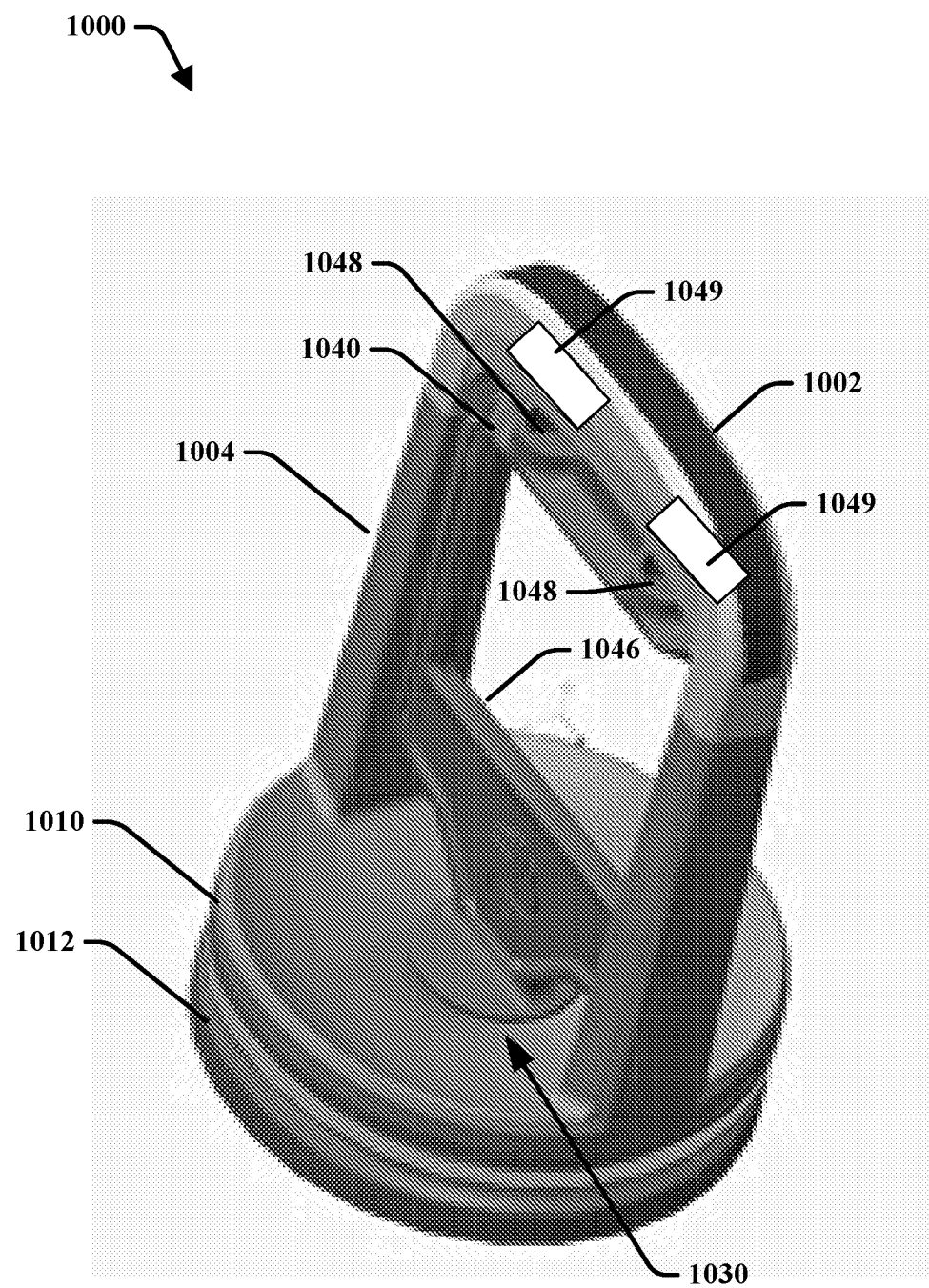
FIG. 10 is a prospective view of a volume reducing device comprising a magnetic biasing member, in accordance with various disclosed aspects.

FIG. 9 illustrates a graph 900 of readings from a 9-DOF sensor during an exemplary blending process. Each line represents an axis of an accelerometer or gyroscope. The graph 900 depicts readings from various periods. Prior to time 902, a user may place the volume reducing device 200 in the container. The sensor 224 may recognize that the readings do not represent a blending process. Further, the seal 214 may not be closed. Between time 902 and 904, the user may be performing some operations while the blender system is relatively stable. At time 904, a motor may be in a blending process. This process may continue until time 906. The sensor 224 may identify that the blending process has begun and has ended at time 906. After time 906, the sensor 224 may instruct the motor 228 to open or release the seal 214.

As above, the sensor 224 may instruct the motor 228 to open the seal 214 after the sensor 224 determines that a blending process was initiated and then terminated. In another example, the sensor 224 may delay instructing the motor 228 for a period of time, such as until time 908. For instance, the sensor 224 may wait to send an instruction for j seconds, where j is a number, after sensor 224 determines the blending process is complete. This may allow the seal 214 to remain closed while a user performs a pulse-like blending process.

While embodiments may refer to sensor 232 activating or sending a signal to initiate closing of the seal 214, it is noted that various other mechanisms may be utilized for closing the seal. For instance, a user may press a button or actuator that sends a signal to instruct the motor 228 to close the seal. In another example, the container or the blender base may include an NFC sensor (not shown) configured to communicate with sensor 232, which may comprise an NFC sensor. The NFC sensor of the base or container may communicate with the sensor 232 when the volume reducing device 200 is within a desired range of the bottom of the container and/or the base. The range of the NFC sensors may be configured to a desired distance. For instance, a blender system may be utilized in a commercial kitchen that may repeatedly produce foodstuff according to a recipe. As such, the volume reducing device 200 may be disposed in generally the same location for multiple blending processes. The range of the NFC sensors may be configured based on this position. In another aspect, the user may remove the container, which may cause the sensor 232 to be out of range, which may cause the motor 228 to open the seal 214.

In at least one embodiment, volume reducing device 200 may not include a motion sensor. Rather, an NFC sensor 232 communicates with a base. The base may send a signal to the sensor 232, which may start a timer. The timer may open the seal after a given time, which may be based on a time of a blending process executed by the base. It is noted that the base may transmit an amount of time to keep the seal 214 closed and/or the amount of time may be predetermined. It is further noted that the base may transmit a signal to open/close the seal 214 that is received by sensor 232. For example, when a user initiates a blending process, the base may transmit a signal to the sensor 232. The sensor 232, in response, may instruct the motor 228 to close the seal. When the base completes the blending process, the base may send a signal to the sensor 232 and the sensor 232, in response, may instruct the motor 228 to open the seal 214.

Figure 11:
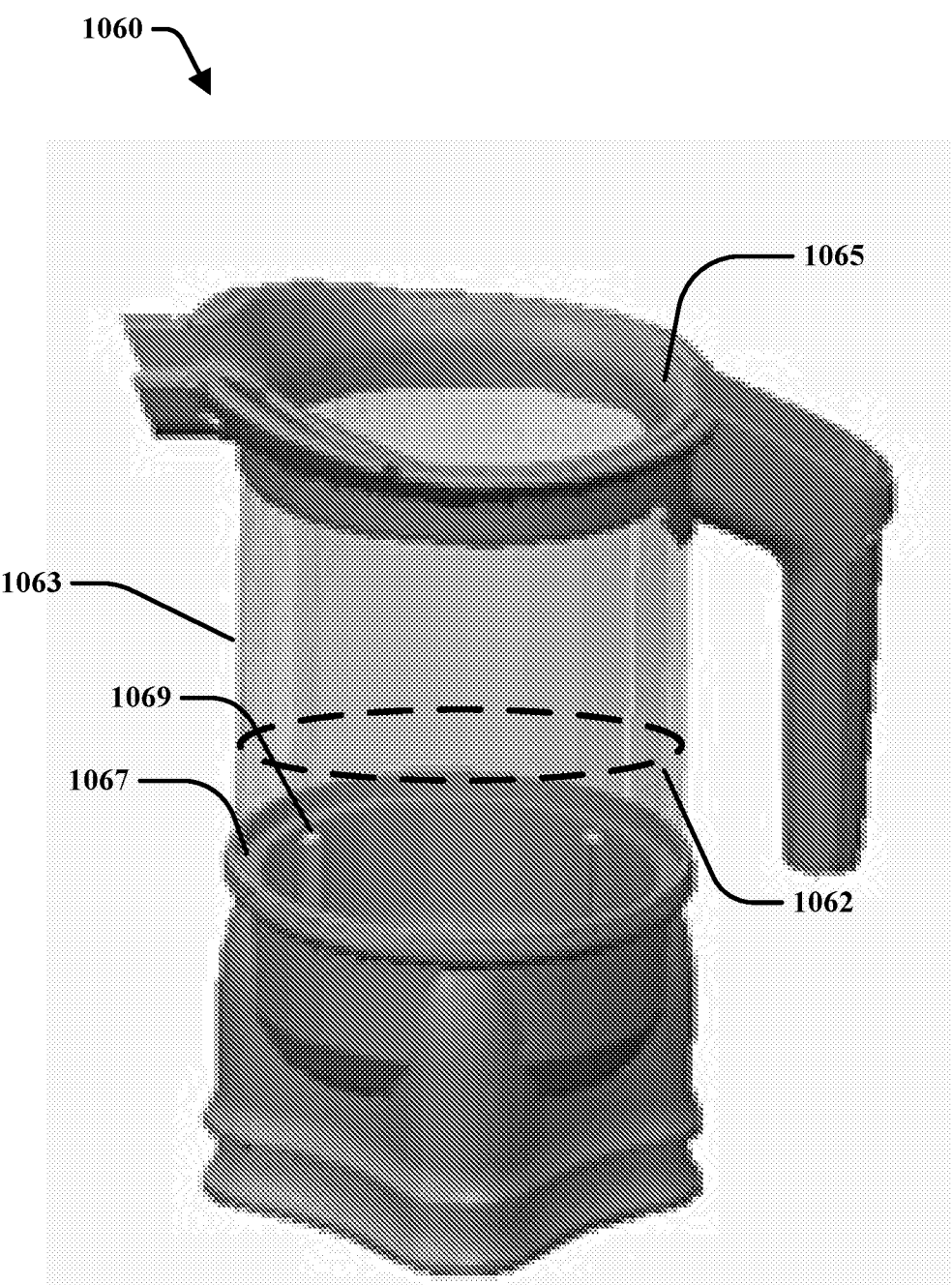
FIG. 11 is a prospective view a container, in accordance with various disclosed aspects.
Figure 12:
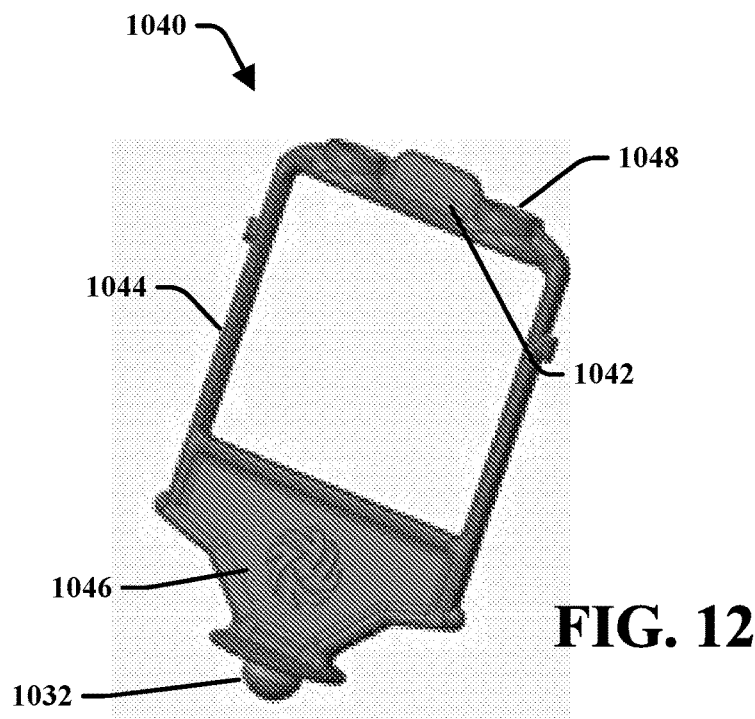
FIG. 12 is a prospective view of an actuator of the volume reducing device of FIG. 10, in accordance with various disclosed aspects.
Figure 13:
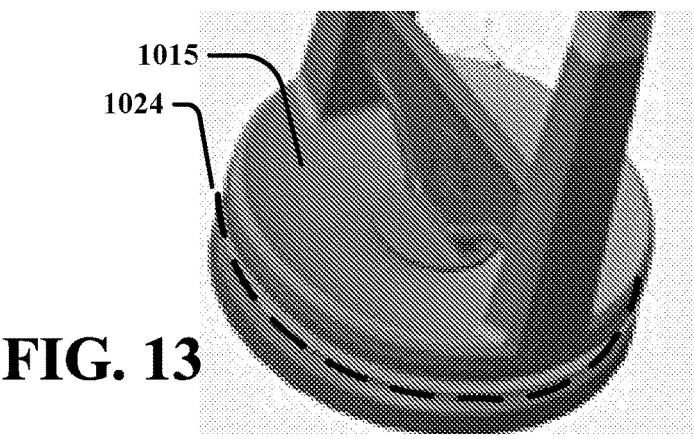
FIG. 13 is a prospective view of the volume reducing device and a gasket, in accordance with various disclosed aspects.
Figure 14:
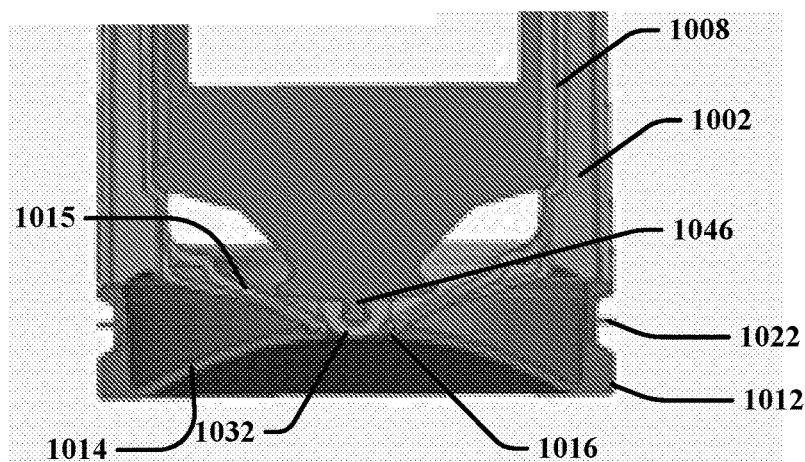
FIG. 14 is a cross-sectional view of the volume reducing device of FIG. 10, in accordance with various disclosed aspects.

Turning to FIGS. 10 and 12-14, there is a volume reducing device 1000 that may reduce a working volume within a blending container, such as blending container 1160 of FIG. 11. It is noted that liked named components of volume reducing device 1000 and the various disclosed volume reducing devices (e.g., volume reducing device 100, 200, etc.) may comprise similar aspects, materials, or the like. It is further noted that while embodiments may refer to different members or parts, such members may be monolithically formed and/or may comprise a single component. For instance, a volume reducing device 1000 may comprise multiple valves, gaskets, seals, or the like. Moreover, it is noted that modifications and variations are considered within the scope and spirit of this disclosure. For instance, a shape of the volume reducing device 1000 may be modified to operatively fit within differently shaped containers.

Volume reducing device 1000 may primarily include a handle 1002 and a shield or body 1010. A user may grasp the handle 1002 and operatively position the body 1010 within a blender container 1060. The body 1010 and/or handle 1002 may comprise various shapes and dimensions. For instance, the handle 1002 may include one or more arms 1004. In another aspect, the body 1010 and/or handle 1002 may comprise materials, such as food grade plastics, metals, glass, wood, rubbers, and the like—which may include polyesters and copolyester (e.g., TRITAN). It is noted that the body 1010 may be monolithically formed with handle 1002, may be attachable (e.g., irremovably or removably) with handle 1002, separately insertable in the container

1060, or the like. Moreover, handle 1002 may be adjustable in height, may lock with body 1010, or the like.

Body 1010 may include a first or bottom surface 1014 and a second or top surface 1015. In embodiments the top surface 1015 or bottom surface 1014 may be generally flat, curved (e.g., concave or convex), conical, tapered, or other desired shapes. In another aspect, the top surface 1015 or bottom surface 1014 may comprise various materials, such as food-grade materials, non-stick materials, etc. For instance, the top surface 1015 may be generally angled downward towards an aperture 1016 of the body 1010. This may allow foodstuff to flow from the top surface 1015 to the aperture 1016. In an example, foodstuff may spill, splash, or otherwise be disposed on the top surface 1015. The angle of the top surface 1015 may allow gravity to draw the foodstuff towards the aperture 1016 such that the foodstuff may pass therethrough and into a working volume of a container, which may reduce waste during the blending cycle. Bottom surface 1014, in an example, may be concave towards an opening or aperture 1016. The bottom surface 1014 may generally face or be directed towards foodstuff within the container 1060. During blending, bottom surface 1014 may force foodstuff towards a blade assembly.

In one or more embodiments, body 1010 may include a sealing member or gasket 1012. The gasket 1012 may be disposed about a periphery 1018 of the body 1010. In another aspect, gasket 1012 may comprise all or a portion of the body 1010. The gasket 1012 may be operatively attached (e.g., removably or irremovably) to the body 1010. As described herein, the gasket 1012 may comprise elastic, anelastic, viscoelastic, or other material that may be deformed to create a tight fitting seal. For example, the gasket 1012 may comprise a rubber material that may be stretched and placed on the periphery 1018. The gasket 1012 may then contract to form a tight or friction fit with the body 1010. In another example, the gasket 1012 may be glued, adhered, or otherwise coupled to the body 1010. It is noted that various other mechanisms may be utilized to attach the gasket 1012 to the body 1010, such as overmolding, chemical disposition, magnetic attachment, or the like. It is noted that the embodiments may include one or more gaskets of other shapes, sizes, and configurations. For instance, gasket 1012 may be sized to friction fit with the periphery 1018.

According to embodiments, volume reducing device 1000 may include a pressure valve 1030 that may allow for release of pressure via an actuator 1040. The actuator 1040 may operatively actuate the valve 1030 between states, such as an open state and a closed state. For instance, when a user places the volume reducing device 1000 within the container 1100, pushing the volume reducing device 1000 downward compresses air within the container 1100. To relieve the pressure, the user may apply force (e.g., squeeze) to the actuator 1040 so that it opens the pressure valve 1030 to allow air to pass through aperture 1016. It is noted that while embodiments may be described with reference to a single valve, other embodiments may comprise other or different valves. Moreover, other or different actuators may be utilized, such as buttons, powered (e.g., electrically powered), cranks, or the like.

Actuator 1040 may predominantly comprise an interface or gripping portion 1042 (which may allow a user to interact with the actuator 1040), a frame 1044 (which may support portions of the actuator 1040), a valve arm 1046, and one or more biasing members 1048. Posts or arms 1004 may extend from body 1010. The arms 1004 may include one or more grooves or channels 1008. The channels 1008 may align the actuator 1040 and/or allow the actuator to move in a desired direction. In an aspect, the actuator 1040 may be held within the channels 1008 via one or more fasteners, a twist-lock mechanism, or the like. In another aspect, the actuator 1040 may be selectively detachable from the arms 1004 so that a user may clean or replace portions of the volume reducing device 1000, or the like.

Biasing members 1048 may comprise one or more magnets that may bias the actuator 1040 in a particular position. It is noted that biasing members 1048 may include p biasing members, where p is a number. In an aspect, the biasing members 1048 may include magnets, weights, elastomeric materials (e.g., rubber), or the like. The biasing members 1048 may bias the actuator 1040 from handle 1002 and/or body 1010, such that the actuator 1040 opens or closes the valve 1030. While biasing members 1048 are shown as disposed between gripping portion 1042 and handle 1002, the biasing members may be disposed within arm 1004, between arm 1004 and frame 1044, or the like. In another aspect, handle 1002 may comprise one or more magnets 1049 that may repel (or attract in certain embodiments) magnetic biasing members 1048.

In an example, the biasing members 1048 may comprise one or more magnets and one or more magnets 1049 of the handle are disposed such that their polarities repel each other. In this arrangement, the biasing members 1048 of the actuator 1040 and the magnets 1049 of the handle force the actuator downwards (e.g., towards body 1010). As such, actuator 1040 is biased such that valve 1030 is in a closed state.

In another aspect, gripping portion 1042 may comprise a portion of actuator 1040 configured for interaction with a user. In an aspect, the gripping portion 1042 may be comprised of an ergonomically-shaped molded plastic, a pad, or the like. Frame 1044 may connect gripping portion 1042 to a valve arm 1046. As such, movement of the gripping portion 1042 may displace the frame 1044 and the valve arm 1046.

Valve arm 1046 may be operatively attached to a seal or plug 1032. Plug 1032 may be friction fit to or otherwise attached to valve arm 1046, such as via magnets, adhesives, overmolding, or the like. It is noted that the plug 1032 may be removable (e.g., for cleaning, replacement, etc.). In embodiments, the plug 1032 may comprise an elastomeric material or other material that may form a seal with aperture 1016. For instance, aperture 1016 may comprise a rubber or plastic material that forms a seal with the plug 1032. In an aspect, the plug may comprise a rounded, spherical, cone shaped, conical, or other shape. According to an example, the plug 1032 comprises a ball-like shape that may be received by a round aperture 1016. As the ball-shaped plug 1032 is received, an angled top surface 1015 may guide the plug 1032 to the aperture 1016. It is noted that the ball shape of the plug 1032 and the cone-like shape of the top surface 1015 may allow for a tight seal even when alignment is off.

Moreover, the aperture 1016 and plug 1032 may be configured for a friction-fit or close-fit (or a vacuum-fit). The biasing members 1048 may apply pressure to the plug 1032 (e.g., via actuator 1040) such that the plug 1032 and aperture 1016 are pressed or sealed together. A user may manipulate the actuator 1040 to break the seal by translating the plug 1032 away from the aperture 1016. As described herein, actuator 1040 may comprise various modifications. Thus, while plug 1032 may be shown as translating above body 1010, it is noted that the plug 1032 may be disposed below the body 1010 (e.g., proximal bottom surface 1014), such that actuation of the actuator 1040 may translate the plug 1032 below the body 1010. In an aspect, the valve 1030 may refer to at least one of the plug 1032, aperture 1016, and/or actuator 1040. It is noted, however, that valve 1030 may comprise other configurations or mechanisms.

Volume reducing device 1000 may be disposed within the container 1062 of FIG. 11. Container 1060 may primarily comprise sidewalls 1063 and an opening 1065. Users may place foodstuff and volume reducing device 1000 within the sidewalls 1063 via the opening 1065. It is noted that sidewalls 1063 may be generally perpendicular or normal with the horizontal. In another aspect, the container 1060 may include one more stop 1067. Stop 1067 may comprise a ledge, protrusion, or the like. The stop 1067 may generally prevent volume reducing device 1000 from contacting a blade assembly (not shown) within the container 1060.

According to embodiments, the volume reducing device 1000 may be disposed within the blending container 1060. A user may position the volume reducing device 1000 at a desired height and/or in contact with the stop 1067. In an aspect, the user may open the valve 1030 via the actuator 1040 while moving the volume reducing device 1000 in or out of the container 1060. This may allow pressure to be released.

During a blending process, rotation of the blade assembly may alter the pressure within a working volume of the container 1060. This may draw the volume reducing device 1000 towards the blade assembly or may increase the operative seal between the volume reducing device 1000 and the container 1060. In an aspect, the bottom surface 1014 may contact foodstuff and/or stop 1067 to generally prevent the volume reducing device 1000 from being sucked into the blade assembly. In another aspect, the pressure may force the plug 1032 downwards. A user, in order to relive pressure and remove volume reducing device 1000, may need to squeeze the handle 1002 and actuator 1040 may open the valve 1030. Opening of the valve 1030 may relieve the pressure between the volume reducing device 1000 and the container 1060. This may make removal of the volume reducing device 1000 from the container 1060 such as after completion of a blending cycle easier for the user.

FIG. 15 illustrates an exemplary blending system 1500 in accordance with various disclosed embodiments. System 1500 may utilize various disclosed aspects. For instance, system 1500 may include a volume reducing device as described herein.

System 1500 primarily includes a blender base 1502, a container 1520 operatively attachable to the blender base 1502, a blade assembly 1530, and a lid 1540 that may be operatively attached to the container. The container 1520 may include walls 1524 and a handle 1522. Foodstuff may be added to the container 1520 for blending. It is noted that the container 1520 may comprise various materials such as plastics, glass, metals, or the like. In another aspect, container 1520 may be powered in any appropriate manner.

The blade assembly 1530, container 1520, and base 1502 may removably or irremovably attach. The container 1520 may be powered in any appropriate manner. While shown as a large-format system, system 1500 may comprise a single serving style system, where the container is filled, a blender base is attached to the container, and then the container is inverted and placed on a base.

The base 1502 includes a motor disposed within a housing. The motor selectively drives the blade assembly 1530 (e.g., cutting blades, chopping blades, whipping blades, spiralizing blades, etc.). The blade assembly 1530 may agitate, impart heat, or otherwise interact with contents within the container. Operation of the blender system 1500 may impart heat into the contents within container 1520.

In at least one embodiment, the blending system 1500 may identify or detect whether the system 1500 is interlocked through mechanical detection (e.g., push rods), user input, image recognition, magnetic detection (e.g., reed switches), electronic detection (e.g., inductive coils, a near field communication (NFC) component), or the like.

System 1500 and processes described herein generally relate to blending or food-processing systems include a food-processing disc comprising one or more inductive coils. In another aspect, one or more of the disc and/or lid may comprise an NFC component that may interact with an NFC component of a blender base. The NFC component of the blender base may receive information regarding the type of the disc and may utilize the blender base may utilize the information to determine a blending process to be utilized by the system.

It is noted that the various embodiments described herein may include other components and/or functionality. It is further noted that while described embodiments refer to a blender or a blender system, various other systems may be utilized in view of the described embodiments. For example, embodiments may be utilized in food processor systems, mixing systems, hand-held blender systems, various other food preparation systems, and the like. As such, references to a blender, blender system, and the like, are understood to include food processor systems, and other mixing systems. Such systems generally include a blender base that may include a motor, a blade assembly, and a controller. Further, such systems may include a container, a display, a memory or a processor.

As used herein, the phrases "blending process," "blending program," and the like are used interchangeably unless context suggests otherwise or warrants a particular distinction among such terms. A blending process may comprise a series or sequence of blender settings and operations to be carried out by the system 1500. In an aspect, a blending process may comprise at least one motor speed and at least one time interval for the given motor speed. For example, a blending process may comprise a series of blender motor speeds to operate the blender blade at the given speed, a series of time intervals corresponding to the given motor speeds, and other blender parameters and timing settings. The blending process may further include a ramp up speed that defines the amount of time the motor takes to reach its predetermined motor speed. The blending process may be stored on a memory and recalled by or communicated to the blending device.

It is understood that the blending volume reducing device may take any appropriate configuration. Those shown herein are merely exemplary. The blending volume reducing device is useful in reducing the working volume of the container so that as the blending device blends in the reduced working volume, the blending operation is more efficient and effective. Various modifications and variations can be made to the present disclosure without departing from the spirit and scope of this disclosure. Thus, it is intended that the present disclosure cover the modifications and variations of this disclosure provided they come within the scope of the appended claims and their equivalents.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a"

and "an" are generally. Furthermore, to the extent that the term "includes" is used in either the detailed description or the claims, such term is intended to be inclusive in a manner similar to the term "comprising" as "comprising" is interpreted when employed as a transitional word in a claim. The claims as follows are intended to include all modifications and alterations insofar as they come within the scope of the claims or the equivalent thereof.

What is claimed is:

1. A blending system comprising:
   a container comprising side walls defining a cavity;
   a blade assembly disposed within the cavity; and
   a blending volume reduction device operatively insertable within the cavity,
   wherein the blending volume reduction device comprises:
      a cover member operatively contacting the side walls when inserted within the cavity to generally seal a working volume of the container, wherein the cover member comprises a first side operatively disposed towards a closed end of the container; a second side disposed opposite the first side; and an aperture formed through the first and the second side, wherein the first side is generally convex;
      a handle extending from the cover member; and
      a pressure valve operatively sealing the working volume of the container from an external environment.

2. The blending system of claim 1, wherein the pressure valve comprises a plug movable between at least a first position and a second position.

3. The blending system of claim 2, wherein the handle comprises an actuator operatively connected to the plug and operatively translating the plug from the first position to the second position.

4. The blending system of claim 3, further comprising at least one magnet disposed in the actuator.

5. The blending system of claim 4, wherein the at least one magnet repels the actuator from the handle.

6. The blending system of claim 2, wherein the plug comprises an elastomeric material.

7. The blending system of claim 1, wherein the second side slopes towards the aperture.

8. The blending system of claim 1, wherein the second side is generally concave.

9. A blending volume reduction device operatively insertable within a cavity, wherein the blending volume reduction device comprises:
   a cover member comprising a first side, a second side, and an aperture formed through the first side and the second side;
   a handle extending from the second side; and
   a pressure valve operatively sealing the aperture, wherein the pressure valve comprises a plug movable between at least a first position and a second position;
   wherein the handle comprises an actuator operatively connected to the plug and operatively translating the plug from the first position to the second position; and
   at least one magnet disposed in the actuator.

10. The blending volume reduction device of claim 9, wherein the cover member comprises an annular gasket disposed about the cover member.

11. The blending volume reduction device of claim 9, wherein the aperture is formed through a general center of the first side and the second side.

12. The blending volume reduction device of claim 9, wherein the pressure valve allows air to pass through the aperture while preventing solids or fluids from passing through the aperture.

13. The blending volume reduction device of claim 9, wherein a plug member includes an elastomeric gasket.

14. A blending system comprising: a blending volume reducing device operatively insertable within a cavity of a container to alter a working volume of the container, and comprising: a seal that operatively seals the working volume;
   a motor operatively controlling the seal; and
   one or more sensors operatively instructing the motor to alter a state of the seal.

15. The blending system of claim 14, wherein the one or more sensors comprise a motion sensor.

16. The blending system of claim 14, wherein the one or more sensors comprise a thermal sensor.

17. The blending system of claim 14, wherein the blending volume reducing device further comprises a wireless transmitter disposed within the blending volume reducing device.

* * * * *